United States Patent
Tsuchida et al.

(10) Patent No.: US 9,537,137 B2
(45) Date of Patent: Jan. 3, 2017

(54) CATHODE ACTIVE MATERIAL, CATHODE ACTIVE MATERIAL LAYER, ALL SOLID STATE BATTERY AND PRODUCING METHOD FOR CATHODE ACTIVE MATERIAL

(75) Inventors: Yasushi Tsuchida, Susono (JP); Hiroshi Nagase, Susono (JP); Shigeki Sato, Fuji (JP); Masashi Kodama, Susono (JP); Haruhisa Hirokawa, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 69 days.

(21) Appl. No.: 14/362,862

(22) PCT Filed: Dec. 9, 2011

(86) PCT No.: PCT/JP2011/078571
§ 371 (c)(1),
(2), (4) Date: Jun. 4, 2014

(87) PCT Pub. No.: WO2013/084352
PCT Pub. Date: Jun. 13, 2013

(65) Prior Publication Data
US 2014/0308572 A1    Oct. 16, 2014

(51) Int. Cl.
*H01M 4/04*    (2006.01)
*H01M 4/505*    (2010.01)
(Continued)

(52) U.S. Cl.
CPC .......... *H01M 4/0402* (2013.01); *H01M 4/0471* (2013.01); *H01M 4/0497* (2013.01);
(Continued)

(58) Field of Classification Search
None
See application file for complete search history.

(56) References Cited

U.S. PATENT DOCUMENTS

| 6,916,580 B2 | 7/2005 | Cho et al. |
| 2007/0082265 A1 | 4/2007 | Itou et al. |

(Continued)

FOREIGN PATENT DOCUMENTS

| CN | 1414650 A | 4/2003 |
| JP | 9-17430 A | 1/1997 |

(Continued)

OTHER PUBLICATIONS

Kobayashi, Y. et al., "Development of high-voltage and high-capacity all-solid-state lithium secondary batteries", Journal of Power Sources, vol. 146, pp. 719-722, (2005).

(Continued)

*Primary Examiner* — Patrick Ryan
*Assistant Examiner* — Wyatt McConnell
(74) *Attorney, Agent, or Firm* — Oblon, McClelland, Maier & Neustadt, L.L.P.

(57) ABSTRACT

The main object of the present invention is to provide a cathode active material capable of reducing the initial interface resistance against a solid electrolyte material. The present invention solves the above-mentioned problems by providing a cathode active material comprising a cathode active substance exhibiting strong basicity and a coat layer formed so as to cover the surface of the above-mentioned cathode active substance and provided with a polyanionic structural part exhibiting acidity.

7 Claims, 3 Drawing Sheets

(51) Int. Cl.
    *H01M 4/525*    (2010.01)
    *H01M 10/052*   (2010.01)
    *H01M 10/0562*  (2010.01)
    *H01M 4/36*     (2006.01)
    *H01M 4/58*     (2010.01)
    *H01M 10/0525*  (2010.01)
    *H01M 4/1391*   (2010.01)
    *H01M 4/62*     (2006.01)

(52) U.S. Cl.
    CPC ......... *H01M 4/1391* (2013.01); *H01M 4/366* (2013.01); *H01M 4/505* (2013.01); *H01M 4/525* (2013.01); *H01M 4/5825* (2013.01); *H01M 4/62* (2013.01); *H01M 10/052* (2013.01); *H01M 10/0525* (2013.01); *H01M 10/0562* (2013.01); *Y02E 60/122* (2013.01); *Y02P 70/54* (2015.11); *Y02T 10/7011* (2013.01)

(56)             References Cited

U.S. PATENT DOCUMENTS

| 2009/0081554 | A1  | 3/2009  | Takada et al. |
| 2009/0278082 | A1  | 11/2009 | Takebayashi et al. |
| 2009/0286164 | A1  | 11/2009 | Wada et al. |
| 2011/0045348 | A1* | 2/2011  | Kubo ............... H01M 4/36 429/209 |
| 2011/0281160 | A1* | 11/2011 | Doi ................. H01M 10/0413 429/211 |
| 2012/0052396 | A1  | 3/2012  | Tsuchida et al. |

FOREIGN PATENT DOCUMENTS

| JP | 9-259869 A      | 10/1997 |
| JP | 11 167919       | 6/1999  |
| JP | 2002 373643     | 12/2002 |
| JP | 2004 119110     | 4/2004  |
| JP | 2005 190996     | 7/2005  |
| JP | 2006-286240 A   | 10/2006 |
| JP | 2009-277597 A   | 11/2009 |
| JP | 2010 135090     | 6/2010  |
| WO | WO 2007/004590 A1 | 1/2007 |

OTHER PUBLICATIONS

International Search Report issued May 22, 2012 in PCT/JP11/078571 Filed Dec. 9, 2011.

* cited by examiner

CATHODE ACTIVE MATERIAL, CATHODE ACTIVE MATERIAL LAYER, ALL SOLID STATE BATTERY AND PRODUCING METHOD FOR CATHODE ACTIVE MATERIAL

TECHNICAL FIELD

The present invention relates to a cathode active material capable of reducing the initial interface resistance against a solid electrolyte material.

BACKGROUND ART

In accordance with a rapid spread of information relevant apparatuses, communication apparatuses and the like such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry and the like. A lithium battery has been presently noticed from the viewpoint of a high energy density among various kinds of batteries.

Liquid electrolyte having a flammable organic solvent as a solvent is used for a presently commercialized lithium battery, so that the installation of a safety device for inhibiting temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

The intention of improving performance of an all solid state battery while noticing an interface between a cathode active substance and a solid electrolyte material has been conventionally attempted in the field of such an all solid state battery. For example, it is known that interface resistance between a cathode active substance and a solid electrolyte material is reduced by covering the surface of a cathode active substance with $LiNbO_3$. However, the covering of the surface of a cathode active substance with $LiNbO_3$ allows the interface resistance between a cathode active substance and a solid electrolyte material to be reduced at the initial stage; yet, the problem is that the interface resistance increases with time. On the contrary, for example, in Patent Literature 1, an all solid state battery, in which a cathode active substance whose surface is covered with a reaction inhibition portion comprising a polyanionic structure—containing compound is used, is disclosed. This intends to achieve higher durability of a battery by covering the surface of the cathode active substance with the compound having a polyanionic structural part high in electrochemical stability to inhibit interface resistance between the cathode active substance and a solid electrolyte material from increasing with time. On the other hand, in Non Patent Literature 1, a polymer battery, in which $LiCoO_2$ (a cathode active substance) whose surface is covered with $Li_3PO_4$ is used, is disclosed. This intends to achieve higher output and higher capacity of a battery by covering the surface of $LiCoO_2$ with $Li_3PO_4$ to inhibit oxidative destruction of a solid polyelectrolyte caused at an interface between $LiCoO_2$ and a solid polyelectrolyte.

CITATION LIST

Patent Literature

Patent Literature 1: Japanese Patent Application Publication (JP-A) No. 2010-135090

Non Patent Literature

Non Patent Literature 1: Yo Kobayashi et al., "Development of high-voltage and high-capacity all-solid-state lithium secondary batteries", Journal of Power Sources 146 (2005) 719-722

SUMMARY OF INVENTION

Technical Problem

As described in examples of Patent Literature 1, the formation of a reaction inhibition portion comprising $Li_3PO_4$—$Li_4SiO_4$ on the surface of $LiCoO_2$ allows interface resistance between a cathode active substance and a solid electrolyte material to be inhibited from increasing with time; yet, the problem is that the initial interface resistance is high. The present invention has been made in view of the above-mentioned problems, and the main object thereof is to provide a cathode active material capable of reducing the initial interface resistance against a solid electrolyte material.

Solution to Problem

In order to solve the above-mentioned problems, the present invention provides a cathode active material comprising a cathode active substance exhibiting strong basicity and a coat layer formed so as to cover the surface of the above-mentioned cathode active substance and provided with a polyanionic structural part exhibiting acidity.

According to the present invention, the coat layer provided with a polyanionic structural part exhibiting acidity is formed so as to cover the surface of the strongly basic cathode active substance, and thereby the polarity (acid-base property) between the cathode active substance and the coat layer is so different that affinity at an interface of both is improved to allow interface resistance to be reduced. Thus, the initial interface resistance between the cathode active substance and the solid electrolyte material may be reduced. Also, the coat layer provided with a polyanionic structural part high in electrochemical stability is formed so as to cover the cathode active substance, so that a reaction between the coat layer and the cathode active substance and the solid electrolyte material may be inhibited and interface resistance between the cathode active substance and the solid electrolyte material may be inhibited from increasing with time.

In the above-mentioned invention, the above-mentioned cathode active substance is preferably an oxide cathode active substance. The reason therefor is to allow the cathode active material with high energy density.

In the above-mentioned invention, the above-mentioned cathode active substance preferably has a compound represented by a general formula $LiNi_xCo_yMn_zO_2$ ($x+y+z=1$, $y \neq 1$, $z \neq 1$) as the main component.

In the above-mentioned invention, the above-mentioned polyanionic structural part is preferably by $PO_4^{3-}$ or $BO_3^{3-}$. The reason therefor is to allow the initial interface resistance between the cathode active substance and the solid electrolyte material to be effectively reduced.

Also, the present invention provides a cathode active material layer comprising the above-mentioned cathode active material and a high resistive layer-forming solid electrolyte material for reacting with the above-mentioned cathode active substance to form a high resistive layer.

According to the present invention, the use of the above-mentioned cathode active material allows the initial interface resistance between the cathode active substance and the solid electrolyte material to be reduced, and allows the cathode active material layer excellent in output characteristics. Also, interface resistance between the cathode active substance and the solid electrolyte material may be inhibited from increasing with time to allow the cathode active material layer excellent in durability.

Also, the present invention provides an all solid state battery comprising a cathode active material layer, an anode active material layer, and a solid electrolyte layer formed between the above-mentioned cathode active material layer and the above-mentioned anode active material layer, characterized in that the above-mentioned cathode active material layer is the cathode active material layer described above.

According to the present invention, the use of the above-mentioned cathode active material layer allows the initial interface resistance between the cathode active substance and the solid electrolyte material to be reduced, and allows the all solid state battery excellent in output characteristics. Also, interface resistance between the cathode active substance and the solid electrolyte material may be inhibited from increasing with time to allow the all solid state battery excellent in durability.

Also, the present invention provides a producing method for a cathode active material, the cathode active material comprising a cathode active substance exhibiting strong basicity and a coat layer formed so as to cover the surface of the above-mentioned cathode active substance and provided with a polyanionic structural part exhibiting acidity, the method comprising steps of: preparing a coat layer-forming coating liquid containing a compound having the above-mentioned polyanionic structural part exhibiting acidity, covering the surface of the above-mentioned cathode active substance with the above-mentioned coat layer-forming coating liquid, and heat-treating the above-mentioned cathode active substance whose surface is covered with the above-mentioned coat layer-forming coating liquid to form the above-mentioned coat layer.

According to the present invention, the coat layer provided with a polyanionic structural part exhibiting acidity is formed so as to cover the surface of the cathode active substance exhibiting strong basicity, and thereby a difference in the polarity (acid-base property) between the cathode active substance and the coat layer improves wettability to allow interface resistance between the cathode active substance and the coat layer to be reduced, and allow the cathode active material capable of reducing the initial interface resistance between the cathode active substance and the solid electrolyte material. Also, the surface of the cathode active substance is covered with the coat layer provided with a polyanionic structural part high in electrochemical stability, so that interface resistance between the cathode active substance and the solid electrolyte material may be inhibited from increasing with time.

Advantageous Effects of Invention

The present invention produces the effect such as to allow a cathode active material capable of reducing the initial interface resistance against a solid electrolyte material.

DESCRIPTION OF EMBODIMENTS

A cathode active material, a cathode active material layer, an all solid state battery, and a producing method for a cathode active material of the present invention are hereinafter described in detail.

A. Cathode Active Material

First, a cathode active material of the present invention is described. The cathode active material of the present invention comprises a cathode active substance exhibiting strong basicity and a coat layer formed so as to cover the surface of the above-mentioned cathode active substance and provided with a polyanionic structural part exhibiting acidity.

Figure 1:
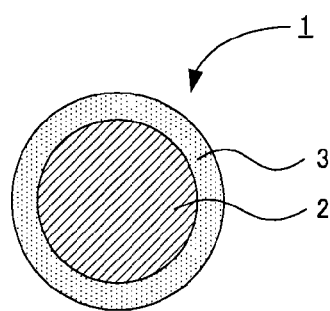
FIG. 1 is a schematic cross-sectional view showing an example of a cathode active material of the present invention.

FIG. 1 is a schematic cross-sectional view showing an example of the cathode active material of the present invention. A cathode active material 1 shown in FIG. 1 comprises a cathode active substance 2 and a coat layer 3 formed so as to cover the surface of the cathode active substance 2. In FIG. 1, the cathode active substance 2 exhibits strong basicity and the coat layer 3 is provided with a polyanionic structural part exhibiting acidity.

According to the present invention, the coat layer provided with a polyanionic structural part exhibiting acidity is formed so as to cover the surface of the strongly basic cathode active substance, and thereby the polarity (acid-base property) between the cathode active substance and the coat layer is so different that affinity at an interface of both is improved to allow interface resistance to be reduced. Thus, the initial interface resistance between the cathode active substance and the solid electrolyte material may be reduced. Also, the coat layer provided with a polyanionic structural part high in electrochemical stability is formed so as to cover the cathode active substance, so that a reaction between the coat layer and the cathode active substance and the solid electrolyte material may be inhibited and interface resistance between the cathode active substance and the solid electrolyte material may be inhibited from increasing with time.

Incidentally, it is specifically assumed from an improvement in affinity at an interface between the cathode active substance and the coat layer that an acidic structural part and a basic structural part are subject to neutralization reaction and bonding and then surface energy decreases.

The cathode active material of the present invention is hereinafter described in each constitution.

1. Cathode Active Substance

First, a cathode active substance in the present invention is described. The cathode active substance in the present invention exhibits strong basicity and varies with kinds of conductive ions of an intended all solid state battery. For example, in the case where the cathode active material of the present invention is used for an all solid lithium secondary battery, the cathode active substance occludes and releases a Li ion. Also, the cathode active substance in the present invention ordinarily reacts with the after-mentioned solid electrolyte material (the high resistive layer-forming solid electrolyte material) to form a high resistive layer. The formation of the high resistive layer may be confirmed by a transmission electron microscope (TEM) and an energy-dispersive X-ray spectroscopy (EDX).

The cathode active substance in the present invention is greatly characterized by exhibiting strong basicity. In the present invention, "strong basicity" signifies that when a cathode active substance-containing aqueous solution obtained by adding 2 mol of the cathode active substance to 100 ml of water is stirred to equilibrium, the pH value of the above-mentioned cathode active substance-containing aqueous solution is 10 or more. The above-mentioned pH value of 10 or more allows the initial interface resistance against a solid electrolyte material equivalent to the initial interface resistance of the cathode active substance whose surface is covered with a conventional niobium oxide (e.g., $LiNbO_3$). Incidentally, the stirring time to equilibrium varies with the cathode active substance and is approximately 5 to 15 minutes, for example. Also, pH meter, litmus paper and the like may be used as a measuring method for pH.

Here, in the above-mentioned Patent Literature 1, an all solid state battery using a cathode, in which a reaction inhibition portion comprising $Li_3PO_4$—$Li_4SiO_4$, namely, a coat layer is formed on a cathode active material layer made of $LiCoO_2$, is disclosed (Example 1 of Patent Literature 1). With regard to $LiCoO_2$ (a cathode active substance) used for this Example, the above-mentioned pH value is 9, which does not exhibit strong basicity. Thus, wettability with $PO_4^{4-}$ as a polyanionic structural part exhibiting acidity is not so favorable, and interface resistance between the cathode active substance and the coat layer is conceived to increase; consequently, the initial interface resistance between the cathode active material layer and the solid electrolyte layer increases as described in the after-mentioned Comparative Example 1. On the contrary, with regard to the cathode active substance in the present invention, the above-mentioned pH value is 10 or more, which exhibits strong basicity; therefore, the above-mentioned wettability becomes so favorable that it is conceived that interface resistance between the cathode active substance and the coat layer may be decreased. Accordingly, the initial interface resistance between the cathode active material layer and the solid electrolyte layer may be reduced as described in the after-mentioned Example 1.

The cathode active substance in the present invention is not particularly limited if the material exhibits strong basicity and reacts with the high resistive layer-forming solid electrolyte material to form the high resistive layer, but an oxide cathode active substance is preferable above all. The reason therefor is that the use of the oxide cathode active substance allows the cathode active material high in energy density. In the case where the cathode active material of the present invention is used for an all solid lithium battery, examples of the oxide cathode active substance to be used include a cathode active substance having a compound represented by a general formula $LiNi_xCo_yMn_zO_2$ ($x+y+z=1$, $y\neq 1$, $z\neq 1$) as the main component. The range of the above-mentioned "x" is $0\leq x\leq 1$, the range of the above-mentioned "y" is $0\leq y\leq 1$, and the range of the above-mentioned "z" is $0\leq z<1$. Specific examples of such a compound include $LiNiO_2$ and $LiNi_{1/3}CO_{1/3}Mn_{1/3}O_2$.

Also, examples of the oxide cathode active substance except the above-mentioned general formula $LiNi_xCo_yM_nO_2$ include a cathode active substance having a compound represented by a general formula $LiNi_{1-x}M_xO_2$ (M is at least one kind selected from metallic elements except Ni and "x" is $0.5<x<1$) as the main component. Examples of the above-mentioned M include Co, Al and Fe. Specific examples of such a compound include $LiNi_{0.8}Co_{0.2}O_2$ and $LiNi_{0.85}Co_{0.10}Al_{0.05}O_2$.

In addition, examples of the oxide cathode active substance to be used include a cathode active substance having a composition represented by a general formula $X(Li(Li_{1/3}M_{2/3})O_2)\cdot Y(LiM'O_2)$ (M is at least one kind selected from tetravalent metallic elements, M' is at least one kind selected from transition metallic elements, X is $0<X<1$, Y is $0<Y<1$, and $x+y=1$) as the main component. Examples of the above-mentioned M include Mn. Also, examples of the above-mentioned M' include Ni, Mn, Co and Fe. Specific examples of such a composition include $Li_{1.2}Mn_{0.5}Ni_{0.15}Co_{0.15}O_2$.

Incidentally, in the present invention, "having as the main component" signifies that the cathode active substance contains the compound or the composition represented by the above-mentioned general formula to such a degree as to allow the effect of the present invention to be performed. Specifically, it signifies that the ratio of the compound or the composition represented by the above-mentioned general formula to all materials composing the cathode active substance is 50 mol % or more. Above all, in the present invention, the above-mentioned ratio is preferably 60 mol % or more, more preferably 70 mol % or more, far more preferably 80 mol % or more, and particularly preferably 90 mol % or more. Also, in the present invention, the cathode active substance may be composed of only the compound or the composition represented by the above-mentioned general formula.

Examples of the shape of the cathode active substance include a particulate shape, preferably a perfectly spherical shape or an elliptically spherical shape, above all. Also, in the case where the cathode active substance is in a particulate shape, the average particle diameter thereof is, for example, preferably within a range of 0.1 μm to 50 μm.

2. Coat Layer

Next, a coat layer in the present invention is described. The coat layer in the present invention is formed so as to cover the surface of the above-mentioned cathode active substance, and provided with a polyanionic structural part exhibiting acidity. The above-mentioned coat layer has the function of inhibiting a reaction between the cathode active substance and the high resistive layer-forming solid electrolyte material, which is caused during the use of a battery. In the present invention, the coat layer is provided with a polyanionic structural part exhibiting acidity, so that wettability becomes favorable with the above-mentioned cathode active substance exhibiting strong basicity, and interface resistance between the cathode active substance and the coat layer may be decreased; as a result, the initial interface resistance against the solid electrolyte material may be reduced.

The coat layer in the present invention is greatly characterized by being provided with a polyanionic structural part exhibiting acidity. In the present invention, "acidity" signifies the property of exhibiting affinity at an interface with the above-mentioned cathode active substance exhibiting strong basicity to such a degree as to allow the effect of the present invention. Specifically, it signifies that an acid dissociation constant (pKa) at the first stage is 10 or less when the polyanionic structural part becomes a hydride. For example, the hydride signifies $H_3PO_4$ (pKa=2.12) and $H_3BO_3$ (pKa=9.24) if the polyanionic structural part are $PO_4^{3-}$ and $BO_3^{3-}$, respectively. Examples of a measuring method for an acid dissociation constant include a method for performing neutralization titration to make a titration curve and calculate an acid dissociation constant from a pH value on the basis of this titration curve.

Also, the polyanionic structural part provided for the above-mentioned coat layer is ordinarily composed of a central element covalently bonded to plural oxygen elements. The central element and the oxygen elements are covalently bonded, so that electrochemical stability may be increased. In the present invention, it is preferable that a difference between electronegativity of the central element and electronegativity of the oxygen elements is 1.7 or less. The reason therefor is to allow a stable covalent bond to be formed. Here, in electronegativity of Pauling, considering that electronegativity of the oxygen elements is 3.44, electronegativity of the central element in the polyanionic structural part is preferably 1.74 or more. In addition, in the present invention, electronegativity of the central element is preferably 1.8 or more, and more preferably 1.9 or more. The reason therefor is to allow a more stable covalent bond to be formed. Below, for reference, electronegativity of elements belonging to Group 12 element to Group 16 element in electronegativity of Pauling is shown in Table 1. Incidentally, electronegativity of Nb used in a conventional niobium oxide (e.g., $LiNbO_3$) is 1.60, which is not shown in the following Table 1.

TABLE 1

| | | Group | | | | |
|---|---|---|---|---|---|---|
| | | 12 | 13 | 14 | 15 | 16 |
| Period | 2 | | B | C | N | O |
| | | | 2.04 | 2.55 | 3.04 | 3.44 |
| | 3 | | Al | Si | P | S |
| | | | 1.61 | 1.90 | 2.19 | 2.58 |
| | 4 | Zn | Ga | Ge | As | Se |
| | | 1.65 | 1.81 | 2.01 | 2.18 | 2.55 |
| | 5 | Cd | In | Sn | Sb | Te |
| | | 1.69 | 1.78 | 1.96 | 2.05 | 2.10 |
| | 6 | Hg | Tl | Pb | Bi | Po |
| | | 2.00 | 1.62 | 2.33 | 2.02 | 2.00 |

The polyanionic structural part in the present invention is not particularly limited if the polyanionic structural part exhibits acidity and is composed of the central element covalently bonded to the plural oxygen elements, but examples thereof include $PO_4^{3-}$, $BO_3^{3-}$, $SO_4^{2-}$, $CO_3^{2-}$ and $NO_3^{-}$; and among them, $PO_4^{3-}$ and $BO_3^{3-}$ are preferable. The reason therefor is to allow the initial interface resistance between the cathode active substance and the solid electrolyte material to be effectively reduced.

The coat layer in the present invention may be provided with the above-mentioned polyanionic structural part by plurality, or further provided with $SiO_4^{4-}$ in addition to the above-mentioned polyanionic structural part. The inclusion of $SiO_4^{4-}$ allows ion conductivity to be improved. Incidentally, it is conceived that $SiO_4^{4-}$ does not influence so much on the polarity (acid-base property) of the coat layer by reason of being the polyanionic structural part exhibiting neutrality. Such a coat layer may be formed by a liquid-phase method (e.g., a sol-gel method) using a precursor solution prepared so as to contain a compound having the polyanionic structural part exhibiting acidity and a compound having $SiO_4^{4-}$. Also, a gas-phase method such as a CVD method and a PVD method may be used.

Also, the coat layer in the present invention is ordinarily provided with the above-mentioned polyanionic structural part exhibiting acidity as well as a cationic part composed of a metallic element as a conductive ion. That is to say, the above-mentioned coat layer is ordinarily composed of a polyanionic structure-containing compound having the above-mentioned polyanionic structural part and the above-mentioned cationic part. The metallic element in the above-mentioned cationic part varies with kinds of all solid state batteries in which the cathode active material of the present invention is used, and examples thereof include alkali metal elements such as Li and Na, and alkaline earth metal elements such as Mg and Ca; and above all, alkali metal elements are preferable and Li is particularly preferable. That is to say, in the present invention, the above-mentioned cationic part is preferably $Li^+$. The reason therefor is to allow an all solid lithium battery useful for various uses.

Also, the coat layer in the present invention is preferably composed of an amorphous polyanionic structure-containing compound. The reason therefor is that the use of the amorphous polyanionic structure-containing compound allows a thin and uniform coat layer to be formed and the increase of coverage factor allows the effect of the present invention to be sufficiently performed. Also, the amorphous polyanionic structure-containing compound is so high in ion conductivity that higher output of the battery may be intended by using the cathode active material of the present invention for an all solid state battery. Incidentally, the amorphous polyanionic structure-containing compound may be confirmed by X-ray diffraction (XRD) measurement.

Also, the thickness of the coat layer formed so as to cover the surface of the cathode active substance is preferably a thickness such that the cathode active substance and the solid electrolyte material do not react in the case where the cathode active material of the present invention is used for an all solid state battery; for example, preferably within a range of 1 nm to 500 nm, and more preferably within a range of 2 nm to 100 nm. The reason therefor is that too small thickness of the coat layer brings a possibility that the cathode active substance and the solid electrolyte material react, while too large thickness of the coat layer brings a possibility that ion conductivity deteriorates. Incidentally, the thickness of the above-mentioned coat layer may adopt an average value measured on the basis of image analysis using a scanning electron microscope (SEM) and a transmission electron microscope (TEM), for example.

Also, the coat layer preferably covers more areas of the cathode active substance, and more preferably covers the whole surface of the cathode active substance. The reason therefor is to allow the effect of the present invention to be further performed. Specifically, the coverage factor of the coat layer formed so as to cover the surface of the cathode active substance is, for example, preferably 20% or more, and more preferably 50% or more. Incidentally, examples of a measuring method for the coverage factor of the above-mentioned coat layer include TEM and XPS.

Examples of a method for forming the coat layer in the present invention include a tumbling fluidized coating method (a sol-gel method), a CVD method, and a PVD method.

3. Cathode Active Material

A producing method for the cathode active material of the present invention is not particularly limited if the method is such as to allow the above-mentioned cathode active material, but examples thereof include the method described in the after-mentioned "D. Producing method for cathode active material."

Also, the cathode active material of the present invention is preferably used as the cathode active substance of an all solid state battery, for example. The reason therefor is to allow the initial interface resistance between the cathode active substance and the solid electrolyte material to be reduced, and allow interface resistance between the cathode active substance and the solid electrolyte material to be inhibited from increasing with time. Thus, an all solid state battery excellent in output characteristics and durability may be obtained.

B. Cathode Active Material Layer

Next, a cathode active material layer of the present invention is described. The cathode active material layer of the present invention comprises the above-mentioned cathode active material and a high resistive layer-forming solid electrolyte material for reacting with the above-mentioned cathode active substance to form a high resistive layer.

Figure 2:
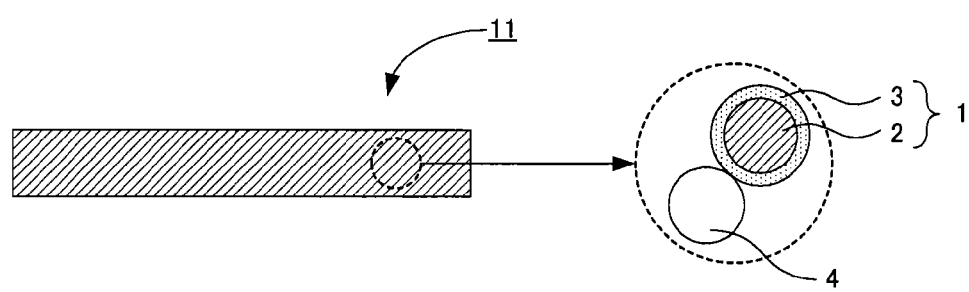
FIG. 2 is a schematic view showing an example of a cathode active material layer of the present invention.

FIG. 2 is an explanatory view showing an example of the cathode active material layer of the present invention. A cathode active material layer 11 shown in FIG. 2 comprises a cathode active material 1 and a high resistive layer-forming solid electrolyte material 4 for reacting with a cathode active substance 2 to form a high resistive layer (not shown). Also, the cathode active material 1 has the cathode active substance 2 and a coat layer 3 formed so as to cover the surface of the cathode active substance 2. The present invention is greatly characterized in that the cathode active material 1 is the cathode active material described in the above-mentioned "A. Cathode active material."

According to the present invention, the use of the above-mentioned cathode active material allows the initial interface resistance between the cathode active substance and the solid electrolyte material to be reduced, and allows the cathode active material layer excellent in output characteristics. Also, interface resistance between the cathode active substance and the solid electrolyte material may be inhibited from increasing with time to allow the cathode active material layer excellent in durability.

The cathode active material layer of the present invention is hereinafter described in each constitution.

1. Cathode Active Material

The cathode active material in the present invention is the same as the contents described in the above-mentioned "A. Cathode active material"; therefore, the description herein is omitted. The content of the cathode active material in the cathode active material layer is, for example, preferably within a range of 10% by volume to 99% by volume, and more preferably within a range of 20% by volume to 99% by volume.

2. High Resistive Layer-Forming Solid Electrolyte Material

Next, a high resistive layer-forming solid electrolyte material in the present invention is described. The high resistive layer-forming solid electrolyte material in the present invention reacts with the cathode active substance to form the high resistive layer. The formation of the high resistive layer may be confirmed by a transmission electron microscope (TEM) and an energy-dispersive X-ray spectroscopy (EDX). The cathode active material layer of the present invention may improve ion conductivity by containing the high resistive layer-forming solid electrolyte material.

In the present invention, the high resistive layer-forming solid electrolyte material preferably has crosslinked chalcogen. The reason therefor is to allow ion conductivity of the cathode active material layer to be further improved. On the other hand, it is conceived that the solid electrolyte material having crosslinked chalcogen (the crosslinked chalcogen-containing solid electrolyte material) is so relatively low in electrochemical stability of crosslinked chalcogen as to react with a conventional coat layer (e.g., a coat layer comprising $LiNbO_3$) to form the high resistive layer easily and emphasize the increase of interface resistance with time. On the contrary, the coat layer of the cathode active material in the present invention is so high in electrochemical stability as to react with the crosslinked chalcogen-containing solid electrolyte material with difficulty and allow the production of the high resistive layer to be inhibited. Thus, it is conceived that interface resistance may be inhibited from increasing with time while improving ion conductivity.

In the present invention, the above-mentioned crosslinked chalcogen is preferably crosslinked sulfur (—S—) or crosslinked oxygen (—O—), and more preferably crosslinked sulfur. The reason therefor is to allow the solid electrolyte material excellent in ion conductivity. Examples of the solid electrolyte material having crosslinked sulfur include $Li_7P_3S_{11}$, $60Li_2S\text{-}40SiS_2$ and $60Li_2S\text{-}40GeS_2$. Here, the above-mentioned $Li_7P_3S_{11}$ is the solid electrolyte material having an $S_3P$—S—$PS_3$ structure and a $PS_4$ structure, and the $S_3P$—S—$PS_3$ structure has crosslinked sulfur. Thus, in the present invention, the high resistive layer-forming solid electrolyte material preferably has the $S_3P$—S—$PS_3$ structure. On the other hand, examples of the solid electrolyte material having crosslinked oxygen include $95(0.6Li_2S\text{-}0.4SiS_2)\text{-}5Li_4SiO_4$, $95(0.67Li_2S\text{-}0.33P_2S_5)\text{-}5Li_3PO_4$ and $95(0.6Li_2S\text{-}0.4GeS_2)\text{-}5Li_3PO_4$.

Also, in the case where the high resistive layer-forming solid electrolyte material is a material having no crosslinked chalcogen, specific examples thereof include $75Li_2S\text{-}25P_2S_5$, $Li_{1.3}Al_{0.3}Ti_{1.7}(PO_4)_3$, $Li_{1.3}Al_{0.3}Ge_{1.7}(PO_4)_3$ and $Li_{3.25}Ge_{0.25}P_{0.75}S_4$. Incidentally, in the present invention, a sulfide solid electrolyte material or an oxide solid electrolyte material may be used as the high resistive layer-forming solid electrolyte material.

Also, examples of the shape of the high resistive layer-forming solid electrolyte material include a particulate shape, preferably a perfectly spherical shape or an elliptically spherical shape, above all. Also, in the case where the high resistive layer-forming solid electrolyte material is in a particulate shape, the average particle diameter thereof is, for example, preferably within a range of 0.1 μm to 50 μm. The content of the high resistive layer-forming solid electrolyte material in the cathode active material layer is preferably, for example, within a range of 0.1% by volume to 80% by volume, above all, within a range of 1% by volume to 60% by volume, and particularly, within a range of 10% by volume to 50% by volume.

In the present invention, the above-mentioned coat layer may be formed so as to cover the surface of the high resistive layer-forming solid electrolyte material.

3. Cathode Active Material Layer

The cathode active material layer of the present invention may further contain at least one of a conductive material and a binder other than the cathode active material and the high resistive layer-forming solid electrolyte material. Examples of the conductive material include acetylene black, Ketjen Black and carbon fiber. Examples of the binder include fluorine-containing binders such as PTFE and PVDF. Also, the thickness of the above-mentioned cathode active material layer is preferably within a range of 0.1 μm to 1000 μm, for example. Also, examples of a forming method for the cathode active material layer include a method for compression-molding a material composing the cathode active material layer. Also, the above-mentioned cathode active material layer is ordinarily used for a battery, and preferably an all solid state battery, above all.

C. All Solid State Battery

Next, an all solid state battery of the present invention is described. The all solid state battery of the present invention comprises a cathode active material layer, an anode active material layer, and a solid electrolyte layer formed between the above-mentioned cathode active material layer and the above-mentioned anode active material layer, characterized in that the above-mentioned cathode active material layer is the cathode active material layer described above.

Figure 3:
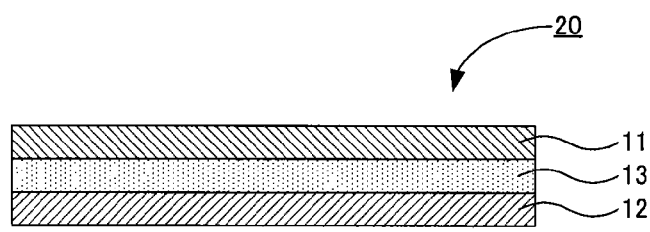
FIG. 3 is a schematic cross-sectional view showing an example of a power generating element of an all solid state battery of the present invention.

FIG. 3 is an explanatory view showing an example of a power generating element of the all solid state battery of the present invention. A power generating element 20 of the all solid state battery shown in FIG. 3 comprises a cathode active material layer 11, an anode active material layer 12, and a solid electrolyte layer 13 formed between the cathode active material layer 11 and the anode active material layer 12. The present invention is greatly characterized in that the cathode active material layer 11 is the cathode active material layer described in the above-mentioned "B. Cathode active material layer."

According to the present invention, the use of the above-mentioned cathode active material layer allows the initial interface resistance between the cathode active substance and the solid electrolyte material to be reduced, and allows the all solid state battery excellent in output characteristics. Also, interface resistance between the cathode active substance and the solid electrolyte material may be inhibited from increasing with time to allow the all solid state battery excellent in durability.

The all solid state battery of the present invention is hereinafter described in each constitution.

1. Cathode Active Material Layer

The cathode active material layer in the present invention is the same as the contents described in the above-mentioned "B. Cathode active material layer"; therefore, the description herein is omitted.

2. Solid Electrolyte Layer

Next, the solid electrolyte layer in the present invention is described. The solid electrolyte layer in the present invention is a layer formed between the cathode active material layer and the anode active material layer, and a layer comprising a solid electrolyte material. The solid electrolyte material contained in the solid electrolyte layer is not particularly limited if the material is such as to have ion conductivity.

In the present invention, the solid electrolyte material contained in the solid electrolyte layer is preferably the high resistive layer-forming solid electrolyte material. The reason therefor is to allow the effect of the present invention to be sufficiently produced. The content of the high resistive layer-forming solid electrolyte material in the solid electrolyte layer is not particularly limited if the content brings a ratio such as to allow desired insulation properties, but is preferably, for example, within a range of 10% by volume to 100% by volume, and above all, within a range of 50% by volume to 100% by volume. In particular, in the present invention, the solid electrolyte layer is preferably composed of only the high resistive layer-forming solid electrolyte material.

Incidentally, the high resistive layer-forming solid electrolyte material is the same as the contents described in the above-mentioned "B. Cathode active material layer." Also, a similar material as a solid electrolyte material used for a general all solid state battery may be used for a solid electrolyte material except the high resistive layer-forming solid electrolyte material.

In the present invention, in the case where the solid electrolyte layer contains the high resistive layer-forming solid electrolyte material, the cathode active material of the cathode active material layer and the high resistive layer-forming solid electrolyte material of the solid electrolyte layer contact. On the occasion, the above-mentioned coat layer may be formed so as to cover the surface of the high resistive layer-forming solid electrolyte material, or the above-mentioned coat layer may not be formed.

Also, the solid electrolyte layer may contain a binder. The reason therefor is that the solid electrolyte layer having flexibility may be obtained by containing a binder. Examples of the binder include fluorine-containing binders such as PTFE and PVDF. The thickness of the solid electrolyte layer is preferably, for example, within a range of 0.1 μm to 1000 μm, and above all, within a range of 0.1 μm to 300 μm.

3. Anode Active Material Layer

Next, the anode active material layer in the present invention is described. The anode active material layer in the present invention is a layer containing at least the anode active substance, and may contain at least one of a solid electrolyte material, a conductive material and a binder as required.

The anode active substance varies with kinds of conductive ions of an intended all solid state battery, and examples thereof include a metal active material and a carbon active material. Examples of the metal active material include In, Al, Si, and Sn. On the other hand, examples of the carbon active material include mesocarbon microbead (MCMB), highly orientated graphite (HOPG), hard carbon, and soft carbon. Also, the content of the anode active substance in the anode active material layer is, for example, preferably within a range of 10% by volume to 99% by volume, and more preferably within a range of 20% by volume to 99% by volume.

The solid electrolyte material is preferably the high resistive layer-forming solid electrolyte material described in the above-mentioned "B. Cathode active material layer." The content of the high resistive layer-forming solid electrolyte material in the anode active material layer is preferably, for example, within a range of 0.1% by volume to 80% by volume, above all, within a range of 1% by volume to 60% by volume, and particularly, within a range of 10% by volume to 50% by volume.

Examples of the conductive material include acetylene black, Ketjen Black and carbon fiber. Examples of the binder include fluorine-containing binders such as PTFE and PVDF. Also, the thickness of the anode active material layer is preferably within a range of 0.1 μm to 1000 μm, for example.

4. Other Constitutions

The all solid state battery of the present invention comprises at least the above-mentioned cathode active material layer, solid electrolyte layer, and anode active material layer, ordinarily further comprising a cathode current collector for collecting current of the cathode active material layer and an anode current collector for collecting current of the anode active material layer. Examples of a material for the cathode current collector include SUS, aluminum, nickel, iron, titanium and carbon, and preferably SUS among them. On the other hand, examples of a material for the anode current collector include SUS, copper, nickel and carbon, and preferably SUS among them. Also, the thickness and shape of the cathode current collector and the anode current collector are preferably selected properly in accordance with factors such as uses of the all solid state battery. Also, a battery case of a general all solid state battery may be used for a battery case used for the present invention. Examples of the battery case include a battery case made of SUS.

5. All Solid State Battery

In the present invention, the use of the above-mentioned cathode active material layer allows the initial interface resistance between the cathode active substance and the solid electrolyte material to be reduced, and allows interface resistance between the cathode active substance and the solid electrolyte material to be inhibited from increasing with time, so that kinds of conductive ions are not particularly limited. Examples of kinds of the all solid state battery of the present invention include an all solid lithium battery, an all solid sodium battery, an all solid magnesium battery and an all solid calcium battery; above all, preferably an all solid lithium battery and an all solid sodium battery, and particularly preferably an all solid lithium battery. Also, the all solid state battery of the present invention may be a primary battery or a secondary battery, and preferably a secondary battery among them. The reason therefor is to be repeatedly charged and discharged and be useful as a car-mounted battery, for example. Examples of the shape of the all solid state battery of the present invention include a coin shape, a laminate shape, a cylindrical shape and a rectangular shape.

Also, a producing method for the all solid state battery of the present invention is not particularly limited if the method is a method such as to allow the above-mentioned all solid state battery, but a similar method as a producing method for a general all solid state battery may be used. Examples of a producing method for the all solid state battery include a method such that a material composing a cathode active material layer, a material composing a solid electrolyte layer and a material composing an anode active material layer are sequentially pressed to thereby produce a power generating element and this power generating element is stored inside a battery case, which is crimped.

D. Producing Method for Cathode Active Material

Next, a producing method for a cathode active material of the present invention is described. The producing method for a cathode active material of the present invention, the cathode active material comprises a cathode active substance exhibiting strong basicity and a coat layer formed so as to cover the surface of the above-mentioned cathode active substance and provided with a polyanionic structural part exhibiting acidity, the method comprising steps of: preparing a coat layer-forming coating liquid containing a compound having the above-mentioned polyanionic structural part exhibiting acidity, covering the surface of the above-mentioned cathode active substance with the above-mentioned coat layer-forming coating liquid, and heat-treating the above-mentioned cathode active substance whose surface is covered with the above-mentioned coat layer-forming coating liquid to form the above-mentioned coat layer.

According to the present invention, the coat layer provided with a polyanionic structural part exhibiting acidity is formed so as to cover the surface of the cathode active substance exhibiting strong basicity, and thereby a difference in the polarity (acid-base property) between the cathode active substance and the coat layer improves wettability to allow interface resistance between the cathode active substance and the coat layer to be reduced, and allow the cathode active material capable of reducing the initial interface resistance between the cathode active substance and the solid electrolyte material. Also, the surface of the cathode active substance is covered with the coat layer provided with a polyanionic structural part high in electrochemical stability, so that interface resistance between the cathode active substance and the solid electrolyte material may be inhibited from increasing with time.

Figure 4:
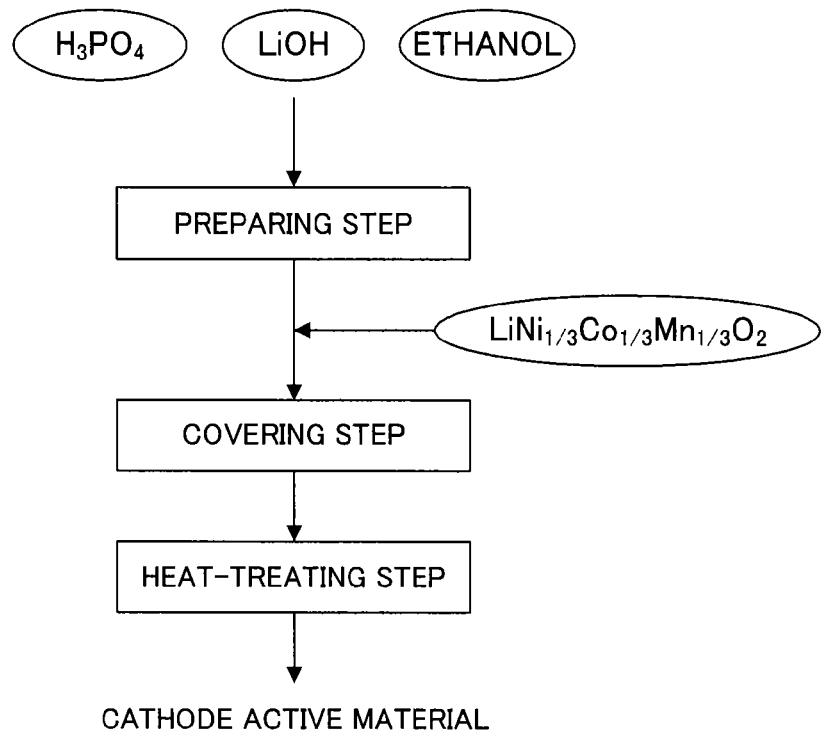
FIG. 4 is a flow chart showing an example of a producing method for a cathode active material of the present invention.

FIG. 4 is a flow chart explaining an example of the producing method for a cathode active material of the present invention. In FIG. 4, first, $H_3PO_4$ (a compound having the polyanionic structural part exhibiting acidity), LiOH (a metallic compound having a cationic part composed of a metallic element as a conductive ion) and ethanol (a solvent) are prepared as a starting material and mixed at a predetermined ratio to thereby prepare a coat layer-forming coating liquid (preparing step). Next, the surface of $LiNi_{1/3}Co_{1/3}Mn_{1/3}O_2$ (a cathode active substance exhibiting strong basicity) is covered with the coat layer-forming coating liquid (covering step). Subsequently, $LiNi_{1/3}Co_{1/3}Mn_{1/3}O_2$ whose surface is covered with the coat layer-forming coating liquid is heat-treated to form a coat layer provided with the polyanionic structural part exhibiting acidity (heat-treating step). Thus, the cathode active material having a cathode active substance exhibiting strong basicity and the coat layer formed so as to cover the surface of the above-mentioned cathode active substance and provided with the polyanionic structural part exhibiting acidity may be obtained.

The producing method for the cathode active material of the present invention is hereinafter described in each step.

1. Preparing Step

First, a preparing step in the present invention is described. The preparing step in the present invention is a step of preparing a coat layer-forming coating liquid containing a compound having the polyanionic structural part exhibiting acidity. Incidentally, the above-mentioned polyanionic structural part is the same as the contents described in the above-mentioned "A. Cathode active material"; therefore, the description herein is omitted.

The above-mentioned compound having the polyanionic structural part used for the present step is not particularly limited if the compound is such as to have the polyanionic structural part exhibiting acidity, and varies with the intended cathode active material. In the case where the above-mentioned polyanionic structural part is $PO_4^{3-}$, examples of the above-mentioned compound having the polyanionic structural part include lithium phosphate. Also, in the case where the above-mentioned polyanionic structural part is $BO_{3-}$, examples of the above-mentioned compound having the polyanionic structural part include lithium borate.

Also, the concentration of the above-mentioned compound having the polyanionic structural part contained in the coat layer-forming coating liquid is properly selected in accordance with the intended cathode active material.

The coat layer-forming coating liquid used for the present step ordinarily contains the metallic compound having a cationic part composed of a metallic element as a conductive ion other than the above-mentioned compound having the polyanionic structural part. The above-mentioned metallic compound having a cationic part is not particularly limited if the compound is a metallic compound having a cationic part composed of a metallic element as a conductive ion, and varies with the intended cathode active material. Examples of the above-mentioned metallic compound having a cationic part include metallic hydroxide, metallic acetate and metallic alkoxide. Specific examples thereof include lithium hydroxide, lithium acetate and lithium ethoxide in the case where the above-mentioned cationic part is $Li^+$.

Also, the concentration of the above-mentioned metallic compound having a cationic part contained in the coat layer-forming coating liquid is properly selected in accordance with the intended cathode active material.

In the present step, the coat layer-forming coating liquid is ordinarily prepared by dissolving or dispersing the above-mentioned compound having the polyanionic structural part and the above-mentioned metallic compound having the cationic part in a solvent. The solvent used for the present step is not particularly limited if the solvent is such as to allow the above-mentioned compound having the polyanionic structural part and the above-mentioned metallic compound having the cationic part to be dissolved or dispersed, but examples thereof include ethanol, propanol and methanol.

In the present step, an optional addition agent may be added to the coat layer-forming coating liquid as required.

2. Covering Step

Next, a covering step in the present invention is described. The covering step in the present invention is a step of covering the surface of the cathode active substance exhibiting strong basicity with the above-mentioned coat layer-forming coating liquid. Incidentally, the cathode active substance exhibiting strong basicity is the same as the contents described in the above-mentioned "A. Cathode active material"; therefore, the description herein is omitted.

In the present step, the film thickness of the coat layer-forming coating liquid for covering the surface of the cathode active substance is properly selected in accordance with the thickness of the intended coat layer; for example, preferably within a range of 0.1 nm to 500 nm, and more preferably within a range of 1 nm to 100 nm. Incidentally, examples of a measuring method for the film thickness of the above-mentioned coat layer-forming coating liquid include TEM.

Also, in the present step, the surface of the above-mentioned cathode active substance is covered with the coat layer-forming coating liquid; more areas of the cathode active substance are covered preferably, and the whole surface of the cathode active substance is covered more preferably. The reason therefor is to allow the effect of the present invention to be further performed. Specifically, the coverage factor of the coat layer-forming coating liquid for covering the surface of the cathode active substance is, for example, preferably 20% or more, and more preferably 50% or more. Incidentally, examples of a measuring method for the coverage factor of the above-mentioned coat layer-forming coating liquid include TEM and XPS.

In the present step, after the surface of the cathode active substance is covered with the coat layer-forming coating liquid, the cathode active substance may be dried with warm air. The removal of a solvent by such drying allows the coat layer for covering the surface of the cathode active substance to be efficiently formed in the after-mentioned heat-treating step.

3. Heat-Treating Step

Next, a heat-treating step in the present invention is described. The heat-treating step in the present invention is a step of heat-treating the above-mentioned cathode active substance whose surface is covered with the above-mentioned coat layer-forming coating liquid to form a coat layer formed so as to cover the surface of the above-mentioned cathode active substance and provided with a polyanionic structural part exhibiting acidity. In the present step, heat-treating removes a solvent remaining inside the coat layer-forming coating liquid covered in the above-mentioned covering step to promote densification, so that a thin film for covering the surface of the cathode active substance (the coat layer) is produced.

The heat-treating temperature in the present step is preferably within a range of 200° C. to 500° C., and more preferably within a range of 300° C. to 400° C.

Also, the heat-treating time in the present step is preferably within a range of 0.5 hour to 20 hours, and more preferably within a range of 0.5 hour to 10 hours.

The heat treatment atmosphere in the present step is not particularly limited if the atmosphere is such as to allow the intended coat layer to be formed and not such as to deteriorate the cathode active material, but examples thereof include air atmosphere; inert gas atmosphere such as nitrogen atmosphere and argon atmosphere; reductive atmosphere such as ammonia atmosphere, hydrogen atmosphere and carbon monoxide atmosphere; and vacuum. Also, examples of a heat-treating method for the cathode active material include a method by using a burning furnace.

4. Others

In the present invention, the cathode active material, in which the coat layer is formed by a liquid-phase method so as to cover the surface of the cathode active substance, may be obtained through the above-mentioned steps. The use of a liquid-phase method may make favorable the wettability of the coat layer provided with a polyanionic structural part exhibiting acidity with the cathode active substance exhibiting strong basicity. Also, a liquid-phase method is a method by using a solution-based precursor, so that the coat layer may be easily formed so as to cover more areas of the surface of the cathode active substance. Examples of the liquid-phase method include a sol-gel method. The sol-gel method is a chemical covering method, so that the bonding between the cathode active substance and the coat layer is so strong as compared with a covering method by mechanical physical force as to allow the cathode active material, in which the coat layer formed so as to cover the surface of the cathode active substance is peeled off with difficulty.

Incidentally, the present invention is not limited to the above-mentioned embodiments. The above-mentioned embodiments are exemplification, and any is included in the technical scope of the present invention if it has substantially the same constitution as the technical idea described in the claims of the present invention and offers similar operation and effect thereto.

EXAMPLES

The present invention is described more specifically while showing examples hereinafter.

Example 1

Production of Cathode Active Material

First, lithium hydroxide (LiOH), phosphoric acid aqueous solution ($H_3PO_4$, 85%) and tetraethoxysilane ($Si(OC_2H_5)_4$) were mixed in ethanol so as to be a molar ratio of Li:P:Si=7:1:1 to prepare a coat layer-forming coating liquid. Next, the above-mentioned coat layer-forming coating liquid was applied on a cathode active substance ($LiNi_{1/3}Co_{1/3}Mn_{1/3}O_2$) by coating equipment using a tumbling fluidized bed, and dried with warm air. Subsequently, powder of $LiNi_{1/3}Co_{1/3}Mn_{1/3}O_2$ on which the above-mentioned coat layer-forming coating liquid was applied was heat-treated in the air at a temperature of 300° C. for 5 hours to thereby form a coat layer comprising $Li_3PO_4$—$Li_4SiO_4$ with a thickness of 20 nm. Thus, a cathode active material comprising $LiNi_{1/3}Co_{1/3}Mn_{1/3}O_2$ whose surface is covered with the above-mentioned coat layer was obtained.

(Synthesis of High Resistive Layer-Forming Solid Electrolyte Material)

First, lithium sulfide ($Li_2S$) and phosphorus pentasulfide ($P_2S_5$) were used as a starting material. These powders were weighed in a glove box under an Ar atmosphere (dew point: −70° C.) so as to become a molar ratio of $Li_2S:P_2S_5$=75:25, and mixed by an agate mortar to obtain a raw material composition. Next, 1 g of the obtained raw material composition was projected into a 45-ml zirconia pot, and zirconia ball (ϕ=10 mm, 10 pieces) was further projected thereinto followed by hermetically sealing the pot completely (Ar atmosphere). This pot was mounted on a planetary ball milling machine (P7™ manufactured by FRITSCH JAPAN CO., LTD.) to perform mechanical milling for 40 hours at the number of revolutionary rotation speeds of 370 rpm and then obtain $75Li_2S$-$25P_2S_5$.

(Production of all Solid State Battery)

First, $Li_7P_3S_{11}$ was obtained by the same method as the method described in JP-A No. 2005-228570. Next, a power generating element 20 of an all solid state battery shown in the above-mentioned FIG. 3 was produced by using a pressing machine. A cathode mixture, in which the above-mentioned cathode active material and $75Li_2S$-$25P_2S_5$ were mixed so as to be a weight ratio of 7:3, was used as a material composing a cathode active material layer 11, an In foil was used as a material composing an anode active material layer 12, and $Li_7P_3S_{11}$ was used as a material composing a solid electrolyte layer 13. An all solid state battery was obtained by using this power generating element.

Example 2

An all solid state battery was obtained in the same manner as Example 1 except for producing a cathode active material in the following manner.

(Production of Cathode Active Material)

First, lithium acetate ($CH_3COOLi$), boric acid ($H_3BO_3$) and tetraethoxysilane ($Si(OC_2H_5)_4$) were mixed in ethanol so as to be a molar ratio of Li:B:Si=7:1:1 to prepare a coat layer-forming coating liquid. Next, the above-mentioned coat layer-forming coating liquid was applied on a cathode active substance ($LiNi_{1/3}Co_{1/3}Mn_{1/3}O_2$) by coating equipment using a tumbling fluidized bed, and dried with warm air. Subsequently, powder of $LiNi_{1/3}CO_{1/3}Mn_{1/3}O_2$ on which the above-mentioned coat layer-forming coating liquid was applied was heat-treated in the air at a temperature of 400° C. for 1 hour to thereby form a coat layer comprising $Li_3BO_3$—$Li_4SiO_4$ with a thickness of 4 nm. Thus, a cathode active material comprising $LiNi_{1/3}CO_{1/3}Mn_{1/3}O_2$ whose surface is covered with the above-mentioned coat layer was obtained.

Comparative Example 1

An all solid state battery was obtained in the same manner as Example 1 except for producing a cathode active material in the following manner.

(Production of Cathode Active Material)

First, lithium hydroxide (LiOH), phosphoric acid aqueous solution ($H_3PO_4$, 85%) and tetraethoxysilane ($Si(OC_2H_5)_4$) were mixed in ethanol so as to be a molar ratio of Li:P:Si=7:1:1 to prepare a coat layer-forming coating liquid. Next, the above-mentioned coat layer-forming coating liquid was applied on a cathode active substance ($LiCoO_2$) by coating equipment using a tumbling fluidized bed, and dried with warm air. Subsequently, powder of $LiCoO_2$ on which the above-mentioned coat layer-forming coating liquid was applied was heat-treated in the air at a temperature of 300° C. for 5 hours to thereby form a coat layer comprising $Li_3PO_4$—$Li_4SiO_4$ with a thickness of 50 nm. Thus, a cathode active material comprising $LiCoO_2$ whose surface is covered with the above-mentioned coat layer was obtained.

Comparative Example 2

An all solid state battery was obtained in the same manner as Example 1 except for producing a cathode active material in the following manner.

(Production of Cathode Active Material)

First, lithium acetate ($CH_3COOLi$), boric acid ($H_3BO_3$) and tetraethoxysilane ($Si(OC_2H_5)_4$) were mixed in ethanol so as to be a molar ratio of Li:B:Si=7:1:1 to prepare a coat layer-forming coating liquid. Next, the above-mentioned coat layer-forming coating liquid was applied on a cathode active substance ($LiCoO_2$) by coating equipment using a tumbling fluidized bed, and dried with warm air. Subsequently, powder of $LiCoO_2$ on which the above-mentioned coat layer-forming coating liquid was applied was heat-treated in the air at a temperature of 400° C. for 1 hour to thereby form a coat layer comprising $Li_3BO_3$—$Li_4SiO_4$ with a thickness of 20 nm. Thus, a cathode active material comprising $LiCoO_2$ whose surface is covered with the above-mentioned coat layer was obtained.

Reference Example 1

An all solid state battery was obtained in the same manner as Example 1 except for producing a cathode active material in the following manner.

(Production of Cathode Active Material)

First, ethoxylithium ($LiOC_2H_5$) and pentaethoxyniobium ($Nb(OC_2H_5)_5$) were mixed in ethanol so as to be a molar ratio of Li:Nb=1:1 to prepare a coat layer-forming coating liquid. Next, the above-mentioned coat layer-forming coating liquid was applied on a cathode active substance ($LiCoO_2$) by coating equipment using a tumbling fluidized bed, and dried with warm air. Subsequently, powder of $LiCoO_2$ on which the above-mentioned coat layer-forming coating liquid was applied was heat-treated in the air at a temperature of 350° C. for 5 hours to thereby form a coat layer comprising $LiNbO_3$ having a coverage factor of 80% with a thickness of 10 nm. Thus, a cathode active material comprising $LiCoO_2$ whose surface is covered with the above-mentioned coat layer was obtained.

Reference Example 2

An all solid state battery was obtained in the same manner as Example 1 except for producing a cathode active material in the following manner.

(Production of Cathode Active Material)

First, ethoxylithium ($LiOC_2H_5$) and pentaethoxyniobium ($Nb(OC_2H_5)_5$) were mixed in ethanol so as to be a molar ratio of Li:Nb=1:1 to prepare a coat layer-forming coating liquid. Next, the above-mentioned coat layer-forming coating liquid was applied on a cathode active substance ($LiNi_{1/3}Co_{1/3}Mn_{1/3}O_2$) by coating equipment using a tumbling fluidized bed, and dried with warm air. Subsequently, powder of $LiNi_{1/3}CO_{1/3}Mn_{1/3}O_2$ on which the above-mentioned coat layer-forming coating liquid was applied was heat-treated in the air at a temperature of 350° C. for 5 hours to thereby form a coat layer comprising $LiNbO_3$ having a coverage factor of 80% with a thickness of 10 nm. Thus, a cathode active material comprising $LiNi_{1/3}Co_{1/3}Mn_{1/3}O_2$ whose surface is covered with the above-mentioned coat layer was obtained.

[Evaluations]

(Component Analysis by X-Ray Photoelectron Spectroscopy Measurement)

Figure 5:
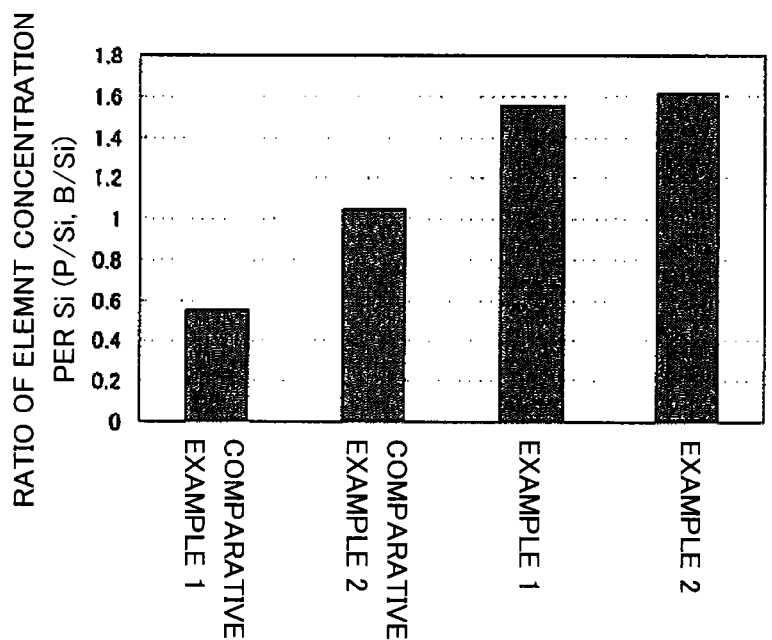
FIG. 5 is a graph showing a result of component analysis by XPS measurement of a surface of a cathode active material obtained in each of Examples 1 and 2 and Comparative Examples 1 and 2.

Component analysis by X-ray photoelectron spectroscopy (XPS) measurement was performed for the surface of the cathode active material obtained in each of Examples 1 and 2 and Comparative Examples 1 and 2 to measure ratio of concentration (P/Si or B/Si) of P element or B element per Si in the coat layer. The results are shown in FIG. 5. Also, the combinations of the cathode active substance and the coat layer of the cathode active material obtained in Examples 1 and 2, Comparative Examples 1 and 2, and Reference Examples 1 and 2 are shown together in Table 2.

As shown in FIG. 5, it was confirmed in Examples 1 and 2 that P/Si or B/Si exceeded 1 vastly. The reason therefor is conceived to be that although P/Si or B/Si ordinarily becomes 1 like Comparative Example 2, in Examples 1 and 2, the cathode active substance was strongly basic $LiNi_{1/3}Co_{1/3}Mn_{1/3}O_2$ and the coat layer had acidic $PO_4^{3-}$ or $BO_3^{3-}$, so that the wettability of the coat layer with the cathode active substance improved and thereby the concentration of P element or B element in the coat layer rose. Incidentally, in Comparative Example 1, P/Si was by far smaller than 1. The reason therefor is conceived to be that P precipitated.

TABLE 2

| Coat Layer | | Cathode Active Substance | |
|---|---|---|---|
| | | $LiCoO_2$ pH 9 | $LiN_{1/3}Co_{1/3}Mn_{1/3}O_2$ pH 10 |
| $LiNbO_3$ | Neutral | Reference Example 1 | Reference Example 2 |
| $Li_3PO_4$—$Li_4SiO_4$ | Acidic | Comparative Example 1 | Example 1 |
| $Li_3BO_3$—$Li_4SiO_4$ | Acidic | Comparative Example 2 | Example 2 |

(Initial Interface Resistance Measurement)

The initial interface resistance was measured for the all solid state battery obtained in each of Examples 1 and 2, Comparative Examples 1 and 2, and Reference Examples 1 and 2. The initial interface resistance was measured in the following manner. First, the all solid state battery was charged. The charging was performed as constant-voltage charge at 3.34 V for 12 hours. After charging, the interface resistance between the cathode active material layer and the solid electrolyte layer was obtained by impedance measurement. The conditions of the impedance measurement were a voltage magnitude of 10 mV, a measuring frequency of 1 MHz to 0.1 Hz, and a temperature of 25° C. The results are shown in FIG. 6.

Figure 6:
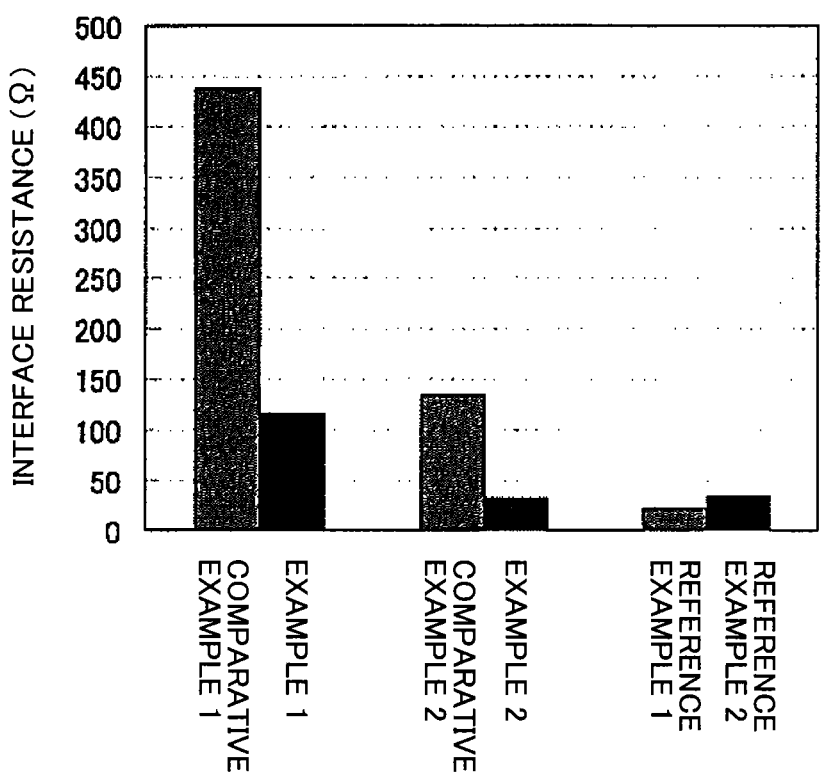
FIG. 6 is a graph showing a result of the initial interface resistance measurement of an all solid state battery obtained in each of Examples 1 and 2, Comparative Examples 1 and 2, and Reference Examples 1 and 2.

As shown in FIG. 6, it was confirmed in Example 1 that the initial interface resistance decreased vastly as compared with Comparative Example 1. Also, it was confirmed in Example 2 that the initial interface resistance decreased vastly as compared with Comparative Example 2

In particular, Example 2 offered the initial interface resistance, which was equivalent to Reference Examples 1 and 2. Thus, it was suggested that the cathode active material of the present invention might perform the initial battery characteristics, which was equivalent to the cathode active material whose surface was covered with a conventional coat layer comprising $LiNbO_3$. Incidentally, Reference Example 2 was so higher, though somewhat, in the initial interface resistance than Reference Example 1 that it is conceived that the effect of the present invention (the reduction of the initial interface resistance) results from not the use of $LiNi_{1/3}Co_{1/3}Mn_{1/3}O_2$ for the cathode active substance but the combination of the cathode active substance and the coat layer.

Example 3

An all solid state battery was obtained in the same manner as Example 1 except for producing a cathode active material in the following manner.

(Production of Cathode Active Material)

First, lithium hydroxide (LiOH) and phosphoric acid aqueous solution ($H_3PO_4$, 85%) were mixed in ethanol so as to be a molar ratio of Li:P=3:1 to prepare a coat layer-forming coating liquid. Next, the above-mentioned coat layer-forming coating liquid was applied on a cathode active substance ($LiNi_{1/3}Co_{1/3}Mn_{1/3}O_2$) by coating equipment using a tumbling fluidized bed and dried with warm air. Subsequently, powder of $LiNi_{1/3}CO_{1/3}Mn_{1/3}O_2$ on which the above-mentioned coat layer-forming coating liquid was applied was heat-treated in the air at a temperature of 300° C. for 5 hours to thereby form a coat layer comprising $Li_3PO_4$ with a thickness of 20 nm. Thus, a cathode active material comprising $LiNi_{1/3}Co_{1/3}Mn_{1/3}O_2$ whose surface is covered with the above-mentioned coat layer was obtained.

Example 4

An all solid state battery was obtained in the same manner as Example 1 except for producing a cathode active material in the following manner.

(Production of Cathode Active Material)

First, lithium acetate ($CH_3COOLi$) and boric acid ($H_3BO_3$) were mixed in ethanol so as to be a molar ratio of Li:B=3:1 to prepare a coat layer-forming coating liquid. Next, the above-mentioned coat layer-forming coating liquid was applied on a cathode active substance ($LiNi_{1/3}CO_{1/3}Mn_{1/3}O_2$) by coating equipment using a tumbling fluidized bed, and dried with warm air. Subsequently, powder of $LiNi_{1/3}CO_{1/3}Mn_{1/3}O_2$ on which the above-mentioned coat layer-forming coating liquid was applied was heat-treated in the air at a temperature of 400° C. for 1 hour to thereby form a coat layer comprising $Li_3BO_3$ with a thickness of 10 nm. Thus, a cathode active material comprising $LiNi_{1/3}Co_{1/3}Mn_{1/3}O_2$ whose surface is covered with the above-mentioned coat layer was obtained.

When the initial interface resistance was measured in the same manner as the above for the all solid state battery obtained in each of Examples 3 and 4, it was confirmed in each of Examples 3 and 4 that the initial interface resistance decreased as compared with the case of using $LiCoO_2$ for the cathode active substance.

REFERENCE SIGNS LIST

1 . . . Cathode active material
2 . . . Cathode active substance
3 . . . Coat layer
4 . . . High resistive layer-forming solid electrolyte material
11 . . . Cathode active material layer
12 . . . Anode active material layer
13 . . . Solid electrolyte layer
20 . . . Power generating element of all solid state battery

The invention claimed is:

1. An all solid state battery, comprising:
a cathode active material layer:
an anode active material layer; and
a solid electrolyte layer comprising a sulfide solid electrolyte material formed between the cathode active material layer and the anode active material layer;
wherein:
the cathode active material layer comprises:
a cathode active material comprising a cathode active substance having a pH of at least 10, and a coat layer formed so as to cover a surface of the cathode active substance and provided with a polyanionic structural part exhibiting acidity; and
a sulfide solid electrolyte material for reacting with the cathode active substance;
the pH is measured after adding 2 mol of the cathode active substance to 100 ml of water and stilling to equilibrium;
the cathode active substance is an oxide cathode active substance; and
the polyanionic structural part comprises at least one member selected from the group consisting of $PO_4^{3-}$, $BO_3^{3-}$, $SO_4^{2-}$ and $NO_3^-$.

2. The all solid state battery according to claim 1, wherein the cathode active substance comprises a compound represented by formula $LiNi_xCo_yMn_zO_2$ as a main component, wherein x+y+z=1, y≠1, and z≠1.

3. The all solid state battery according to claim 1, wherein the cathode active substance comprises a compound represented by formula $LiNi_xCo_yMn_zO_2$ as a main component, wherein x+y+z=1, 0<x<1, 0<y<1, and 0<z<1.

4. The all solid state battery according to claim 1, wherein the polyanionic structural part comprises at least one member selected from the group consisting of $BO_3^{3-}$, $SO_4^{2-}$, and $NO_3^-$.

5. The all solid state battery according to claim 1, wherein the coat layer further comprises $SiO_4^{4-}$.

6. The all solid state battery according to claim 1, wherein the battery is free of liquid electrolyte.

7. The all solid state battery according to claim 1, wherein the coat layer has a thickness of 2 to 100 nm.

* * * * *